US011872638B2

United States Patent
Hecht et al.

(10) Patent No.: US 11,872,638 B2
(45) Date of Patent: Jan. 16, 2024

(54) METHOD OF CLAMPING A Y-AXIS FEED DIRECTION PARTING BLADE OR CUTTING INSERT AND A HOLDER AND TOOL ASSEMBLY FOR SAME

(71) Applicant: ISCAR, LTD., Tefen (IL)

(72) Inventors: Gil Hecht, Nahariya (IL); Ely Erlich, Karmiel (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/376,288

(22) Filed: Jul. 15, 2021

(65) Prior Publication Data

US 2022/0016717 A1   Jan. 20, 2022

Related U.S. Application Data

(60) Provisional application No. 63/054,081, filed on Jul. 20, 2020.

(51) Int. Cl.
  *B23B 29/04* (2006.01)
  *B23B 27/04* (2006.01)
  *B23B 27/08* (2006.01)

(52) U.S. Cl.
  CPC .......... *B23B 29/043* (2013.01); *B23B 27/04* (2013.01); *B23B 27/086* (2013.01); *B23B 2205/02* (2013.01)

(58) Field of Classification Search
  CPC ....... B23B 27/08; B23B 27/04; B23B 27/086; B23B 27/14; B23B 29/043; B23B 29/04; B23B 29/046; B23B 2205/02; B23B 2210/02; B23B 2210/022; B23B 2210/08
  See application file for complete search history.

(56) References Cited

U.S. PATENT DOCUMENTS 2,836,240 A * 5/1958 Nuding .................. B23B 27/08
                                                  407/117
3,062,080 A * 11/1962 Kurtz ..................... B23B 29/04
                                                  82/158
(Continued)

FOREIGN PATENT DOCUMENTS

DE       2 041 380          3/1972
RU       2 526 908          8/2014
WO    WO 2010/101503        9/2010

OTHER PUBLICATIONS

International Search Report dated Oct. 21, 2021, issued in PCT counterpart application (No. PCT/IL2021/050870).

(Continued)

*Primary Examiner* — Nicole N Ramos
(74) *Attorney, Agent, or Firm* — Womble Bond Dickinson (US) LLP

(57) ABSTRACT

A method of clamping a first cutting insert or an adaptor to a holder. Either the holder includes two insert pockets configured for machining in two different orthogonal directions or the holder includes a single adaptor pocket configured for holding the adaptor in two different orthogonal directions. The method includes the steps of choosing one of two orthogonal directions for machining and securing either the first cutting insert to an appropriate one of the two pockets or securing the adaptor to the adaptor pocket for machining in the chosen orthogonal direction.

19 Claims, 6 Drawing Sheets

(56) References Cited

U.S. PATENT DOCUMENTS

| | | | | |
|---|---|---|---|---|
| 3,551,977 | A * | 1/1971 | Novkov | B23B 29/043 |
| | | | | D15/138 |
| 3,603,185 | A * | 9/1971 | Curry | B23B 29/248 |
| | | | | 82/158 |
| 4,023,246 | A * | 5/1977 | Haug | B26D 7/2614 |
| | | | | 407/56 |
| 4,035,889 | A * | 7/1977 | McCreery | B23B 29/043 |
| | | | | 407/117 |
| 4,051,584 | A * | 10/1977 | Huser | B23B 27/04 |
| | | | | 407/107 |
| 4,579,488 | A | 4/1986 | Griffin | |
| 5,112,163 | A * | 5/1992 | Veilleux | B23B 27/04 |
| | | | | 82/158 |
| 5,288,180 | A * | 2/1994 | Hedlund | B23B 27/04 |
| | | | | 407/101 |
| 6,568,303 | B1 * | 5/2003 | Bentley | B23B 5/14 |
| | | | | 82/47 |
| 9,457,410 | B2 * | 10/2016 | Törnström | B23B 29/248 |
| 11,247,360 | B2 * | 2/2022 | Lundstrom | B23B 29/02 |
| 11,565,327 | B2 * | 1/2023 | Ishai | B23B 27/04 |
| 2002/0002886 | A1 | 1/2002 | Hansson et al. | |
| 2010/0322722 | A1 | 12/2010 | Lin | |
| 2013/0223941 | A1 * | 8/2013 | Bozkurt | B23P 15/34 |
| | | | | 29/527.1 |
| 2019/0111493 | A1 * | 4/2019 | Miyashita | B23B 29/00 |
| 2019/0240741 | A1 | 8/2019 | Hecht et al. | |
| 2019/0358710 | A1 * | 11/2019 | Lundstrom | B23B 29/043 |
| 2020/0009757 | A1 | 1/2020 | Lundstrom et al. | |

OTHER PUBLICATIONS

Written Opinion dated Oct. 21, 2021, issued in PCT counterpart application (No. PCT/IL2021/050870).

\* cited by examiner

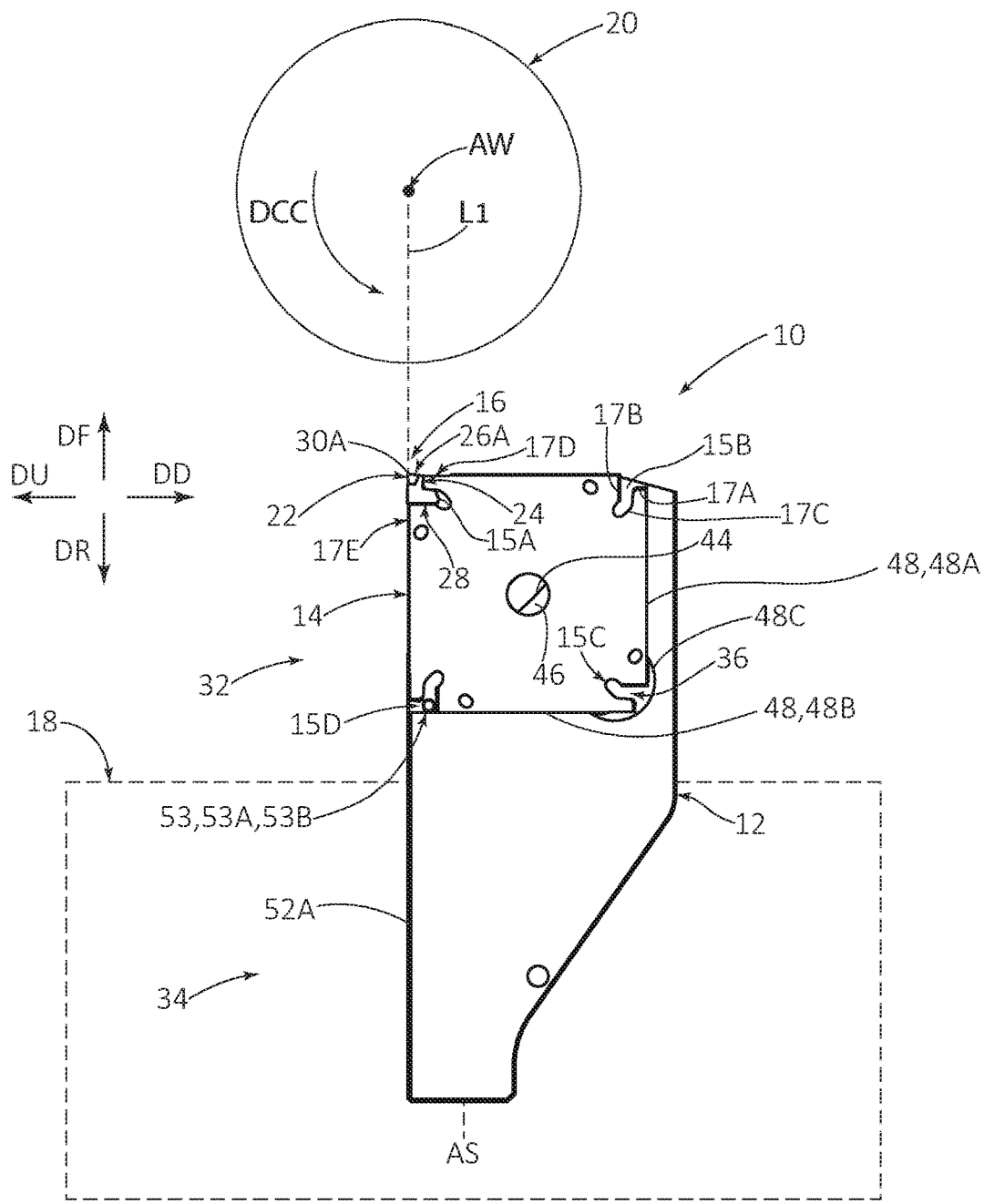
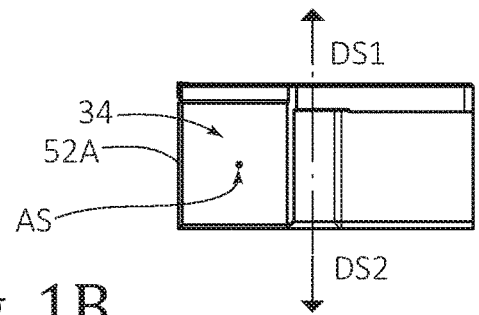
Fig. 1A
Fig. 1B

METHOD OF CLAMPING A Y-AXIS FEED DIRECTION PARTING BLADE OR CUTTING INSERT AND A HOLDER AND TOOL ASSEMBLY FOR SAME

RELATED APPLICATIONS

Priority is claimed to U.S. Provisional Patent Application No. 63/054,081 filed Jul. 20, 2020. The contents of the aforementioned application are incorporated by reference in their entirety.

FIELD OF THE INVENTION

The subject matter of the present invention relates generally to a holder configured for machining operations along a Y-axis feed direction. The holder has a pocket configured to hold either a cutting insert (also referred to as "insert" hereinafter) or an adaptor which, in turn, is configured to hold an insert. The present invention is also directed to a tool assembly comprising said holder and cutting insert or said holder, adaptor and a cutting insert held by the holder, as well as a method of mounting the cutting insert or adaptor to the holder and/or machining with the tool assembly.

More particularly, the present invention relates to a preferred type of adaptor which is a parting blade (also referred to as "blade" or "parting adaptor" hereinafter) and in such case the parting adaptor, holder, as well as the tool assembly comprising same, are configured for parting and grooving operations along a Y-axis feed direction.

BACKGROUND OF THE INVENTION

The present application relates to a tool assembly and machining operations in a so-called Y-axis feed direction.

Such operations are disclosed, for example, in patent publications US 2020/0009757, directed to Y-axis blade portions, and US 2019/0358710 directed to a method of machining related to the same construction (hereinafter: "said patent publications").

Reverting to said patent publications, it is stated therein that there was a desire to reduce vibrations in traditional parting-off or deep grooving operations. Accordingly, an alternative blade portion is proposed in which, to summarize, the blade portion is elongated in basically the same direction as a main clearance surface of a cutting insert mounted to the blade portion.

The present applicant has also further discussed such tools in US 2019/0240741 assigned to the present applicant.

The present invention is directed to an improved Y-axis holder and a tool assembly comprising same, as well as a machining method using said adaptor. In particularly advantageous embodiments, the improved Y-axis adaptor is a parting blade.

SUMMARY OF THE INVENTION

It has been observed that relatively few CNC machines are capable of machining operations in the Y-axis feed direction.

Accordingly, Y-axis feed tools are in low demand and are consequently relatively expensive due to the low production numbers thereof.

A secondary problem noted is that the set-up of Y-axis tool assemblies is complex relative to standard X-axis tool assemblies, with numerous offsets required before starting a machining operation.

The present invention is the development of a single holder, and tool assembly comprising same, configured for both machining operations in the Y-axis feed direction as well as in the X-axis feed direction (hereinafter, for the purposes of conciseness, this concept will be called "two-orthogonal directions").

The present invention is also directed to a method of mounting a cutting insert or adaptor to such holder.

According to one advantageous embodiment, the holder is configured for securing an insert thereto in the two-orthogonal directions. Said holder can be configured, for example, according to a first aspect by providing an X-axis insert pocket and a different Y-axis insert pocket on the same holder. Stated differently, a holder can be configured with two pockets, each pocket being configured for machining in a different orthogonal direction.

The holder can be defined by said X-axis insert pocket and Y-axis insert pocket being oriented orthogonal to each (in the way elaborated below).

More precisely, there is provided a method of clamping a first cutting insert or an adaptor to a holder, the holder either comprising first and second insert pockets each configured for machining a workpiece in one of two different orthogonal directions or the holder comprising a single adaptor pocket configured for holding the adaptor in first and second orientations each configured for machining a workpiece in one of two different orthogonal directions, the method comprising the steps of: choosing a first orthogonal direction; and securing either: the first cutting insert to the first insert pocket for machining in the chosen first orthogonal direction; or the adaptor to the adaptor pocket in the first orientation for machining in the chosen first orthogonal direction.

In accordance with a second aspect of the present invention there is provided a holder comprising: a shank portion comprising a shank central axis; and a head portion; the head portion comprising a first insert pocket and a second insert pocket; the first insert pocket comprises a base surface extending basically perpendicular to the shank central axis and at least one flank wall extending in a longitudinal direction basically parallel to the shank central axis; and the second insert pocket comprises a base surface extending in a longitudinal direction basically parallel to the shank central axis and at least one flank wall extending in a direction basically perpendicular to the shank central axis.

Alternatively defined, in accordance with a third aspect of the present invention there is provided a holder comprising: a shank portion comprising a shank central axis; and a head portion; the head portion comprising a first insert pocket and a second insert pocket; the first insert pocket comprises a screw hole extending basically perpendicular to the shank central axis; and the second insert pocket comprises a screw hole extending basically parallel to the shank central axis.

Further alternatively defined, in accordance with a fourth aspect of the present invention, there is provided a holder comprising: a first insert pocket; and a second insert pocket; the first insert pocket is oriented for holding a cutting insert in a first orthogonal direction; and the second insert pocket is oriented for holding a cutting insert in a second orthogonal direction different to the first orthogonal direction. Alternatively stated, the first insert pocket is oriented for holding a cutting insert in a first direction and the second insert pocket is oriented for holding a cutting insert in a second direction which is orthogonal to the first direction.

According to any of the aspects above the features can preferably include the following. The holder can comprise a head portion formed with an external rib. The external rib can be located adjacent to the shank portion. When two cutting inserts are mounted to the holder, a rake surface of the first cutting insert can be substantially parallel with an end surface of the head portion and a rake surface of the second insert can be substantially parallel with a side surface of the head portion.

Alternatively, according to a further aspect, the holder can be defined as a tool assembly (i.e. the assembly comprising the holder and further including at least one cutting insert). The cutting insert comprises a forwardmost cutting edge (when mounted in an insert pocket) which helps define the orientation for the two-orthogonal directions of the two insert pockets.

It will be understood that in certain CNC machines, the holder can be held in one orientation (for example the X-axis feed orientation as exemplified in FIG. 6B) and can perform a machining operation with a first insert in the X-axis insert pocket, and without detaching the holder from the turret or tool-post, the holder can be reoriented by the CNC machine to perform a machining operation with a second insert in the Y-axis insert pocket (as exemplified in FIG. 6C). It will be understood that said operations could alternatively be performed in the reverse order.

Alternatively, the holder (or tool assembly) could simply be used for either machining in the X-axis feed direction or the Y-axis feed direction. This allows a manufacturer to produce a dual-use tool in high quantities. Additionally, it can reduce the stock needed to be maintained by a user.

The insert pockets according to some preferred embodiments can be identical (and hence be configured to hold the same insert as exemplified in FIG. 6). Alternatively, according to other preferred embodiments the insert pockets can be different (and hence configured to hold different shaped inserts).

It will be understood that the above-described tool may be considered disadvantageous in that many users will not prefer a holder with the extra expense of a second insert pocket, and may thus prefer a standard holder. Nonetheless, it is believed that at least some users may find the dual Y-axis and X-axis capability, beneficial.

Yet another advantage is that an integral holder with an insert pocket formed thereon is more structurally rigid than a holder holding an adaptor with an insert pocket formed on the adaptor. Stated differently, there is a loss in stability by having non-integral parts.

The two insert pockets can preferably be spaced-apart from each other (e.g., the two insert pockets can be located at diametrically opposite corners of the head portion). However, it is feasible for the two insert pockets to be on a common side of the holder or even to have the insert pockets open out to each other, albeit being orthogonally positioned relative to each other.

According to yet another aspect of the present invention, there is provided a holder configured for securing an adaptor thereto in the two-orthogonal directions.

This is an advantageous embodiment despite having lesser rigidity than the example above (since optimal support is not achievable in two different expected machining directions, at least not with a compactly designed tool). However, since adaptors are typically significantly larger than cutting inserts, such disadvantage of optimal support is considered outweighed by the benefit of a single holder allowing machining in two different orthogonal directions.

The adaptor in turn comprises an insert pocket. Preferably the adaptor is indexable and comprises a plurality of insert pockets.

Preferably, the holder comprises a single adaptor pocket configured for securing the adaptor in both of two-orthogonal directions.

As a single adaptor pocket can be used for both of the two-orthogonal directions, such embodiment can be more economical than two separate insert pockets.

Said configuration of the single adaptor pocket can be, for example, by providing additional holes in the adaptor pocket (for each of the two-orthogonal directions).

Stated differently, an adaptor pocket can be configured with at least one clamping hole for one orientation and at least one clamping hole for the other orientation. In some preferred embodiments, at least one clamping hole is not used when clamped in one orientation.

Alternatively, said single adaptor pocket could comprise an external clamp or wedge (of the type shown in FIG. 12A of USPA 2019/0240741) to hold the adaptor to the adaptor pocket. In order to configure the holder for holding an adaptor in both orientations, the clamp is preferably configured to bias the adaptor into the corner of the insert pocket. Alternatively, the clamp could be used at a side of an adaptor pocket appropriate to a particular orientation.

While the above-described embodiments allow the tool assembly to be moved in two orthogonal directions during cutting operations, it has been conceived to position the adaptor such that fewer offsets are required during setup.

To elaborate, the holder and adaptor can be configured such that when the adaptor is mounted to the holder, no offset is required in at least one of the two orientations, at least along one axis. For example, if the holder is primarily configured for X-axis feed machining as shown in FIG. 1A, and when the adaptor is secured as shown in said figure, there is no need for any offset to be inputted into a CNC machine. And when the same adaptor is changed to the Y-axis feed machining direction as shown in FIG. 2, there is a need to provide an offset in the X-axis direction but not the Y-axis feed direction. In contrast, in the pocket shown in FIG. 5, which is a modified pocket basically similar to that shown in USPA 2019/0240741, two offsets are needed for each orientation.

More preferably, according to one particularly advantageous embodiment, the holder and adaptor are configured such that when the adaptor is mounted to the holder, no offset is required in both of the two orientations, in at least along one axis. Thus, for example, if the holder is primarily configured for X-axis feed machining as shown in FIG. 1A, and the adaptor is secured as shown in said figure, there is no need for any offset whatsoever to be inputted into a CNC machine. And in the Y-axis feed machining direction as shown in FIG. 2, there is a need to provide only a single offset in the X-axis direction. It will be understood that this greatly improves the user-friendliness of operation of such a holder and/or tool assembly.

Further to the above developments, it was found that such adaptor could mistakenly be secured to the holder incorrectly (e.g. the adaptor could be secured to the holder for X-axis feed operations and then operated in the Y-axis direction). To prevent such occurrences, it was conceived to provide a mechanism to prevent incorrect assembly.

One preferred aspect provides in the holder's pocket a so-called "pocket projection" which projects into the pocket and prevents an adaptor from being incorrectly inserted therein (in the wrong orientation). Stated differently, the pocket projection is accommodated in a recess of the adaptor in one orthogonal orientation of the adaptor, but not in the other.

Preferably, the pocket projection is removable and re-attachable so that a user can use the alternative orientation, when desired. In the example shown, the pocket projection is a removable pin having a basically cylindrical or cylindrical, shape. It will be understood, however, that the pocket projection does not have to be cylindrical, and that other pin shapes are contemplated.

Preferably, the recess of the adaptor has a non-cylindrical shape so the adaptor can be easily placed on the adaptor pocket.

Preferably, the recess of the adaptor is an unused insert pocket, thus the adaptor itself does not need to be provided with additional recesses which can weaken or complicate the construction thereof.

Specific advantageous embodiments for parting operations are shown, although it is feasible that an adaptor may also hold a turning insert in two-different orientations, mutatis mutandis.

To elaborate on the offset description above, whereas a standard X-axis feed parting blade (or "parting adaptor") can be secured to a holder (which is secured to a machine interface) and a parting operation can be initiated without any need to offset the position of the tool assembly (i.e. to adjust the settings for a non-zero position of the cutting edge; called hereinafter "offset"), with known Y-axis tool assemblies an offset is required along both the X-axis and Y-axis.

The present invention thus allows a, preferably non-elongated, preferably indexable, adaptor to have less offsets than is currently known.

While machines capable of Y-axis feed machining are capable of providing both said offsets, it was conceived to reduce the setup complexity by providing a single-offset tool assembly to reduce the complexity for a user. While the setup is more complex than the X-axis feed tool assembly which does not require any offset, it can still provide the Y-axis stability (reduced vibration) advantage.

In accordance with some preferred embodiments, there is provided a tool assembly comprising: a parting adaptor; a cutting insert secured to an insert pocket of the parting adaptor and comprising a forwardmost cutting edge; and a holder comprising a holder shank portion in turn comprising an upwardmost holder shank surface and a holder shank cross-sectional shape; wherein: the holder shank cross-sectional shape is square or rectangular and the forwardmost cutting edge is aligned with the upwardmost holder shank surface; or the holder shank cross-sectional shape is round and the holder shank axis extends to the forwardmost cutting edge.

According to another aspect of the present invention, there is provided a holder comprising: a shank portion comprising a shank central axis; and a head portion; the head portion comprising an adaptor pocket; the adaptor pocket comprising: a first plurality of holes for a first orientation; a second plurality of holes for a second orientation; the first and second plurality of holes being mirror symmetrically positioned.

According to another aspect of the present invention, there is provided a holder comprising: a shank portion comprising a shank central axis; and a head portion; the head portion comprising an adaptor pocket; the adaptor pocket comprising: a first plurality of holes for a first orientation; a second plurality of holes for a second orientation; a spacing of the first plurality of holes is the same as a spacing of the second plurality of holes; the first and second plurality of holes are shifted relative to each other.

According to another aspect of the present invention, there is provided a tool assembly comprising: a holder comprising an adaptor pocket; and an adaptor; the holder and adaptor are configured such that the adaptor can be mounted to the adaptor pocket in two different orthogonal directions.

The holder can be according to any of the aspects described.

The adaptor can be configured to mounted to the adaptor pocket in a first orthogonal position via at least one hole of the first plurality of holes and can be configured to be mounted to the adaptor pocket in a different orthogonal position via at least one of the second plurality of holes.

The adaptor can be configured to mounted to the adaptor pocket in a first orthogonal position via only the first plurality of holes and can be configured to be mounted to the adaptor pocket in a different orthogonal position via only the second plurality of holes.

A method of mounting an adaptor can be as follows. The adaptor can be secured to the adaptor pocket in a first orientation using fewer than all of said plurality of holes. Subsequently, the adaptor can be removed and secured to the adaptor pocket in a second orientation using fewer than all of said plurality of holes and not using at least one of the plurality of holes used to secure the adaptor to the first orientation.

The adaptor can be configured to be mounted to the adaptor pocket in a first orthogonal orientation and is configured to be impeded by a pocket projection from being mounted to the adaptor pocket in a different orthogonal orientation. The adaptor being able to be mounted to the adaptor pocket in the different orthogonal orientation if the pocket projection is removed.

Preferably the pocket projection is positioned so that in the first orthogonal orientation, it projects into an insert pocket of the adaptor mounted in the first orthogonal orientation to the adaptor pocket.

Notably, for a square or rectangular holder shank (which is a standard shank type in the industry), to clarify, as known in the art, the upwardmost holder shank surface is typically aligned with the forwardmost cutting edge for a standard X-axis holder. However no known Y-axis tool assemblies are configured for the same holder shank surface (which would be called a "forwardmost holder shank surface" if the Y-axis feed direction would be considered alone; herein the name upwardmost holder shank surface is used since the X-axis is taken as a reference) to also be aligned with a cutting edge in the Y-axis orthogonal orientation. Additionally, no known tool assemblies are known for holding an adaptor in two different orthogonal orientations.

Said configuration above allows a forwardmost cutting edge to be aligned with an upwardmost holder shank surface which will then only require for the tool assembly to be offset in a single direction, if needed, in the X-axis direction (i.e. which is a direction parallel to a direction of elongation of the holder shank portion).

The alternative cross-sectional shape mentioned as "round" is a simplified way to define the basically cylindrical or basically conical shank cross sections as per the types described in ISO standard 26623-1 or ISO 12164-3. It will be understood that this too is a standard shank type in the industry. For such shank types, a forwardmost cutting edge is to be aligned with a central holder shank axis, which will then only require for the tool assembly to be offset in a single direction, if needed, i.e. in the X-axis direction.

The alternative option is the same concept, merely accounting for the two main shank types (i.e. with the alignment position being in the center of the round-type shank, or with the front of the square/rectangular type shank) used. It will be understood that the word "round" extends to different shank types but essentially means that the alignment position is along the center of the shanks.

In accordance with another preferred embodiment, there is provided a tool assembly comprising: a parting adaptor; a cutting insert; and a holder; the parting adaptor comprising: opposing first and second sides; and a peripheral edge connecting the first and second sides; the peripheral edge comprising: opposing front and rear sub-edges; and an upper sub-edge connecting the front and rear sub-edges; the first and second sides defining a first sideways direction directed from the first side towards the second side and a second sideways direction opposite to the first sideways direction; a forward direction is defined perpendicular to the first and second sideways directions and directed from the rear sub-edge towards the front sub-edge, and a rearward direction opposite to the forward direction; an upward direction is defined perpendicular to both the first and second sideways directions and to the forward and rearward directions; a downward direction is defined opposite to the upward direction; an insert pocket is formed at an intersection of the front and upper sub-edges; the insert pocket comprises: a base jaw comprising a forwardmost base jaw surface; a second jaw at least partially located upward of the base seat jaw; and a slot end connecting the base jaw and the second jaw; the adaptor shank portion comprising: an adaptor clamping arrangement; the cutting insert is secured to the insert pocket and comprises: an insert base surface abutting the base jaw; an upwardly facing rake surface located above the insert base surface; an insert second surface abutting the second jaw; a forwardmost clearance surface extending downwardly from the rake surface; and a forwardmost cutting edge formed at an intersection of the rake surface and the forwardmost clearance surface; the holder comprising: a holder head portion; and a holder shank portion connected to the holder head portion; the holder head portion comprising: an adaptor pocket to which the adaptor shank portion is secured; the holder shank portion comprising: a holder shank axis extending through the center of the holder shank and extending parallel with the upward and downward directions; a holder shank cross-sectional shape extending perpendicular to the holder shank axis and being either (a) square or rectangular or (b) round; an upwardmost holder shank surface; and an imaginary line extends from the upwardmost holder shank surface; wherein: the holder shank cross-sectional shape is square or rectangular and the forwardmost cutting edge is aligned with the upwardmost holder shank surface; or the holder shank cross-sectional shape is round and the holder shank axis extends to the forwardmost cutting edge.

According to yet another aspect of the present invention, there is provided a method of machining a workpiece having a central rotation axis (AW) about which the workpiece is configured to rotate, with a cutting tool having an operative cutting insert, the cutting tool configured to be selectively moved towards the central rotation axis (AW) in either a first cutting direction or a second cutting direction relative to the workpiece, the first and second cutting directions being perpendicular to the central rotation axis (AW) and also to one another, the method comprising; providing a cutting tool comprising a tool holder having a shank portion and a head portion, the shank portion retained in a machine interface, the head portion having an operative cutting insert mounted therein; and selectively moving the cutting tool relative to the workpiece, to machine the workpiece, in either: the first cutting direction while the workpiece rotates in a first rotational direction, such that cutting forces experienced by the operative cutting insert are directed transverse to a direction from the head portion to the machine interface; or the second cutting direction while the workpiece rotates in a second rotational direction opposite the first rotational direction, such that cutting forces experienced by the operative cutting insert are directed parallel to said direction from the head portion to the machine interface.

The head portion can comprise an end surface and first and second insert pockets which both open out to the end surface, the first and second insert pockets having identical, respective first and second cutting inserts seated therein; the first cutting insert is the operative cutting insert when the cutting tool is moved in the first cutting direction; and the second cutting insert is the operative cutting insert when the cutting tool is moved in the second cutting direction.

The adaptor can comprise first and second main adaptor sides, each side being configured to face the pocket surface when the adaptor is mounted in the adaptor pocket, the adaptor further comprising a plurality of insert pockets, at least one of said plurality of insert pockets having a cutting insert retained therein.

The method can comprise, selectively, either: securing the adaptor in the adaptor pocket in a first orientation with the first main adaptor side facing the pocket surface, prior to moving the cutting tool relative to the workpiece in the first cutting direction; or securing the adaptor in the adaptor pocket in a second orientation with the second main adaptor side facing the pocket surface, prior to moving the cutting tool relative to the workpiece in the second cutting direction.

According to yet another aspect of the present invention, there is provided a method of machining a workpiece having a central rotation axis (AW) about which the workpiece is configured to rotate, with a cutting tool configured to be selectively moved towards the central rotation axis (AW) in either a first cutting direction or a second cutting direction relative to the workpiece, to machine the workpiece, the first and second cutting directions being perpendicular to the central rotation axis (AW) and also to one another, the method comprising; providing a cutting tool comprising a tool holder having a shank portion and a head portion, the shank portion retained in a machine interface, the head portion comprising an adaptor pocket having a pocket surface; providing an adaptor comprising first and second main adaptor sides, each side being configured to face the pocket surface when the adaptor is mounted in the adaptor pocket, the adaptor further comprising a plurality of insert pockets, at least one of said plurality of insert pockets having a cutting insert retained therein; and selectively, either: mounting the adaptor in the adaptor pocket with the first main adaptor side facing the pocket surface, and then moving the cutting tool relative to the workpiece in the first cutting direction while the workpiece rotates in a first rotational direction, to machine the workpiece, such that cutting forces experienced by an operative cutting insert are directed transverse to a direction from the head portion to the machine interface; or mounting the adaptor in the adaptor pocket with the second main adaptor side facing the pocket surface, and then moving the cutting tool relative to the workpiece in the second cutting direction while the workpiece rotates in a second rotational direction opposite the first rotational direction, to machine the workpiece, such that cutting forces experienced by an operative cutting insert are directed parallel to said direction from the head portion to the machine interface.

According to yet another aspect of the present invention, there is provided a method of machining a workpiece having a central rotation axis (AW) about which the workpiece is configured to rotate, with a cutting tool configured to be selectively moved towards the central rotation axis (AW) in either a first cutting direction or a second cutting direction relative to the workpiece, the first and second cutting directions being perpendicular to the central rotation axis (AW) and also to one another, the method comprising; providing a cutting tool comprising a tool holder having a shank portion and a head portion, the shank portion retained in a machine interface, the head portion comprising an end surface and first and second insert pockets which both open out to the end surface, the first and second insert pockets having identical, respective first and second cutting inserts seated therein; and selectively moving the cutting tool relative to the workpiece, to machine the workpiece, in either: the first cutting direction while the workpiece rotates in a first rotational direction, such that only the first cutting insert is operative and cutting forces experienced by the first cutting insert are directed transverse to a direction from the head portion to the machine interface; or the second cutting direction while the workpiece rotates in a second rotational direction opposite the first rotational direction, such that only the second cutting insert is operative and cutting forces experienced by the second cutting insert are directed parallel to said direction from the head portion to the machine interface.

According to yet another aspect of the present invention, there is provided a method of clamping an insert or adaptor to a holder comprising the steps of:

(a) Choosing one of two orthogonal directions; and (b) securing the insert or adaptor to an appropriate one of two pockets, or securing the adaptor in one of two possible orthogonal orientations to an adaptor pocket.

A preferred further step is moving, relatively, the holder towards a workpiece in the selected one of the two orthogonal directions.

A preferred step is setting an offset only in a X-axis direction, defined as a direction parallel to the holder's elongated shank; and subsequent to step (b), moving the parting adaptor, relative to a rotating workpiece, in the Y-axis direction, defined as a direction perpendicular to the X-axis direction, to machine or part-off the workpiece.

A preferred step is setting an offset only in a Y-axis direction, defined as a direction parallel to the holder's elongated shank; and subsequent to step (b), moving the parting adaptor, relative to a rotating workpiece, in the X-axis direction, defined as a direction perpendicular to the Y-axis direction, to machine or part-off the workpiece.

In a most preferred embodiment the adaptor can be only providing a single offset for one of the two orientations.

A preferred additional step includes removing the adaptor (in the case where it is an adaptor in step b) and securing the adaptor in the second (different) orthogonal orientation. Yet a further step including moving, relatively, the holder towards a workpiece in the selected second orthogonal direction.

The above examples/embodiments and method, when directed to an adaptor, is preferably performed using an adaptor configured for parting operations (hereinafter "parting adaptor").

It would not seem to be beneficial for a single offset to be simpler to an operator than two offsets (since an offset needs to be inputted in any case, however the present inventor believes that such benefit is nonetheless may be preferred over a slight amount of additional stability (potentially lost by aligning the adaptor or insert in a slightly less optimal position to achieve the desired alignment advantage).

A preferred additional step (in the case where it is a cutting insert in step b) is securing a second cutting insert to the second of the two pockets and, moving the tool assembly along a first axis to machine a workpiece with the first cutting insert and subsequently the tool assembly is moved along a second axis orthogonal to the first axis to machine the workpiece with the second cutting insert. Preferably, this further includes rotating the workpiece in a first direction during said machining with the first cutting insert, and rotating the workpiece in an opposite direction during said machining with the second cutting insert.

Preferably an insert pocket's second jaw is located in its entirety rearward of the base jaw. Alternatively or additionally, the insert pocket's second jaw and base jaw extend adjacent to each other in a direction parallel to the upward and downward directions.

It is preferred that an adaptor according to the present invention comprise a plurality of insert pockets.

It is preferred that the insert pockets of the present invention be of the resilient type (i.e. without screws) exemplified.

Various features above are described with words such as "forwardmost". It will be understood that such word means relative to the remainder of the component (e.g. the adaptor or cutting edge) said feature is more in the most forward direction (i.e. with the closest proximity to a workpiece; stated differently in the most forward direction of the feed direction). It will also be understood that all directions given are for reference of features relative to one another and not in an absolute sense to the ground. Similarly, it will be understood that while directions may have been optionally chosen to be defined relative to a particular component such as a parting adaptor, they could similarly be defined relative to a holder or tool assembly.

As is well known in the art, a rake surface is the surface above which machined chips are intended to flow and a clearance surface is typically designed to be receded from a cutting edge.

Preferably the adaptor's bearing surfaces are mirror symmetric about a bisector pivot line extending through the two orthogonal positions.

The bisector line can extend through the forwardmost cutting edge of the insert.

Preferably the adaptor's bearing surfaces are straight in side view.

Preferably the adaptor has a quadrilateral, preferably regular quadrilateral and most preferably square shape in a side view.

It will be understood that the present invention refers to tool assemblies and holders configured for different orthogonal orientations only. To elaborate, the present invention does not relate to tool designs configured to allow minute adjustments of position that may extend all the way to a, for example, 90° (or more) repositioning of an insert or adaptor.

According to any of the aspects, the holder can be moved in the first or second orthogonal directions to machine the workpiece (or repositioned from one orientation to the other).

In cases where the adaptor is remounted to the adaptor pocket in a different orientation, either the same insert pocket can be used for machining or a different insert pocket.

BRIEF DESCRIPTION OF THE DRAWINGS

For a better understanding of the subject matter of the present application, and to show how the same may be carried out in practice, reference will now be made to the accompanying drawings, in which:

FIG. 1A is a side view of a tool assembly in an X-axis feed orientation according to the present invention, further showing a schematic workpiece and a schematic machine interface;

FIG. 1B is a rear view of the tool assembly in FIG. 1A;

DETAILED DESCRIPTION

Figure 2:
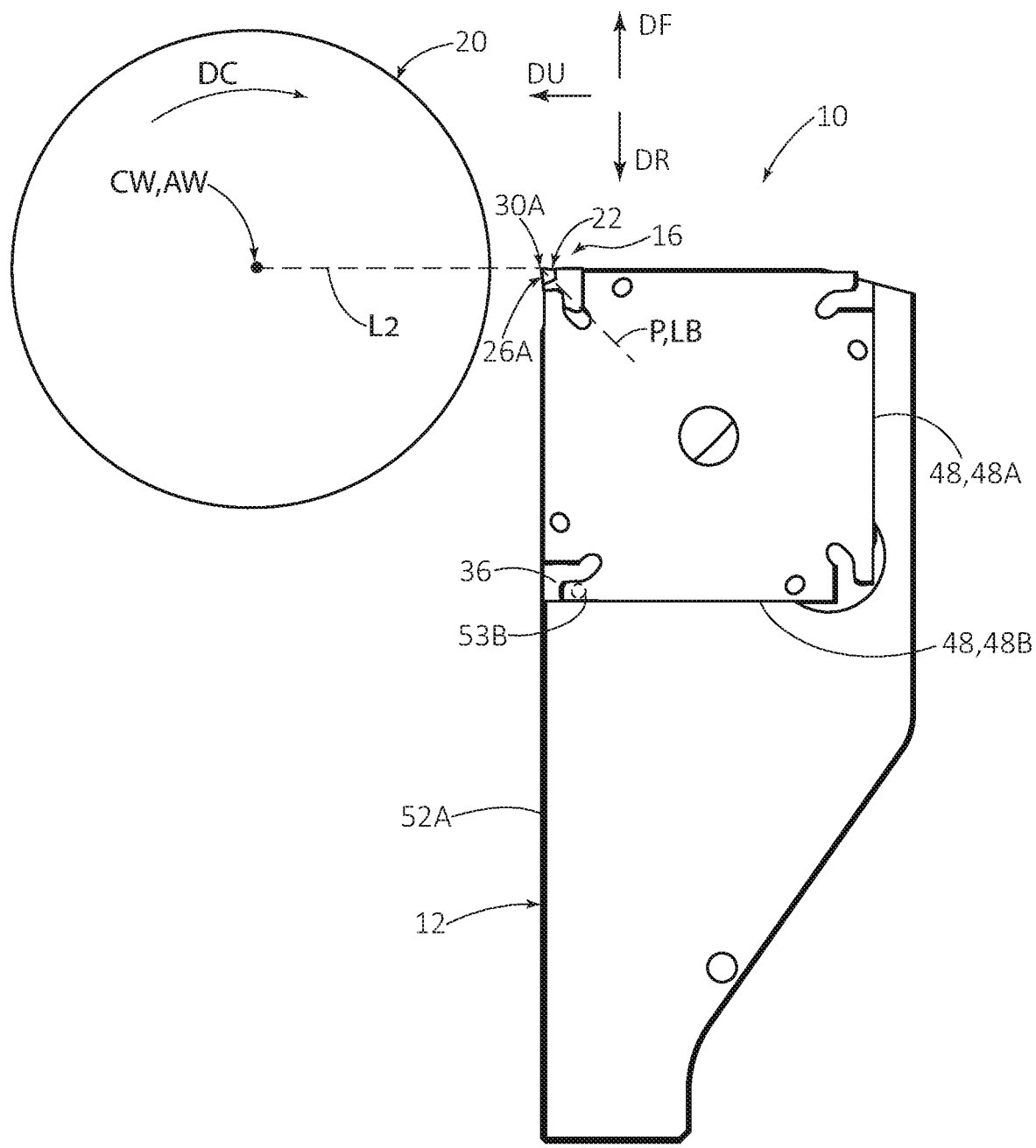
FIG. 2 is a side view of the tool assembly in FIG. 1A, with an adaptor thereof oriented in a Y-axis feed orientation, further showing a schematic workpiece (except the pocket being devoid of a pocket projection 53 shown in FIG. 1A and better shown in FIG. 4A)

Referring to FIGS. 1A and 1B, a tool assembly 10 is shown, the tool assembly 10 comprising a holder 12, a parting adaptor 14 (generally similar to the parting blade shown in FIGS. 18A to 18C of USPA 2019/0240741, at least with respect to the shape of the parting blade, the straight bearing surfaces, and at least one insert pocket (which in this example is first, second, third and fourth insert pockets 15A, 15B, 15C, 15D) secured to the holder 12, as well as an operative cutting insert 16 secured to the parting adaptor 14.

The contents of USPA 2019/0240741, and most particularly FIGS. 18, 19 and 20, are incorporated herein by reference.

Referring particularly to FIG. 1A, the holder 12 is positioned proximate to a schematic cylindrical rotating workpiece 20. The workpiece 20 has a central workpiece axis AW and during machining is rotated in the counterclockwise direction DCC in this view, as indicated.

For explanation and a frame of reference, the figures show a forward direction DF, a rearward direction DR, an upward direction DU, a downward direction DD, a first sideways direction DS1 and a second sideways direction DS2.

The forward direction DF constitutes an X-axis feed direction in which direction the tool assembly 10 is moved to machine the workpiece 20.

The cutting insert 16 comprises: a rake surface 22 and an opposing insert base surface 24, a forwardmost clearance (relief) surface 26A extending downwardly (as well as slightly inwardly; i.e. in the downward direction DD and slightly in the rearward direction DR) from the rake surface 22 and an opposing insert rear surface 28, a forwardmost cutting edge 30A formed at an intersection of the rake surface 22 and the forwardmost clearance surface 26A.

Preferably, the rake surface 22 comprises a chip forming arrangement (not shown).

Each of the adaptor's first, second, third and fourth insert pockets 15A, 15B, 15C, 15D are identical and equally circumferentially spaced about an index axis center AI (shown in FIG. 3) around which the adaptor 14 has four-way rotational symmetry. As seen in the FIG. 1A, the second insert pocket 15B is seen to comprise a base jaw 17A, a second jaw 17B and a slot end 17C. It is understood that the remaining pockets 15A, 15C and 15D have similar construction.

Reverting to the first insert pocket 15A, adjacent to each of the insert pockets 15, on an external side of the parting adaptor 14, adjacent to the base jaw 17A there is an external pocket relief surface 17D, and adjacent to the second jaw 17B there is an external pocket rake surface 17E.

Figure 3:
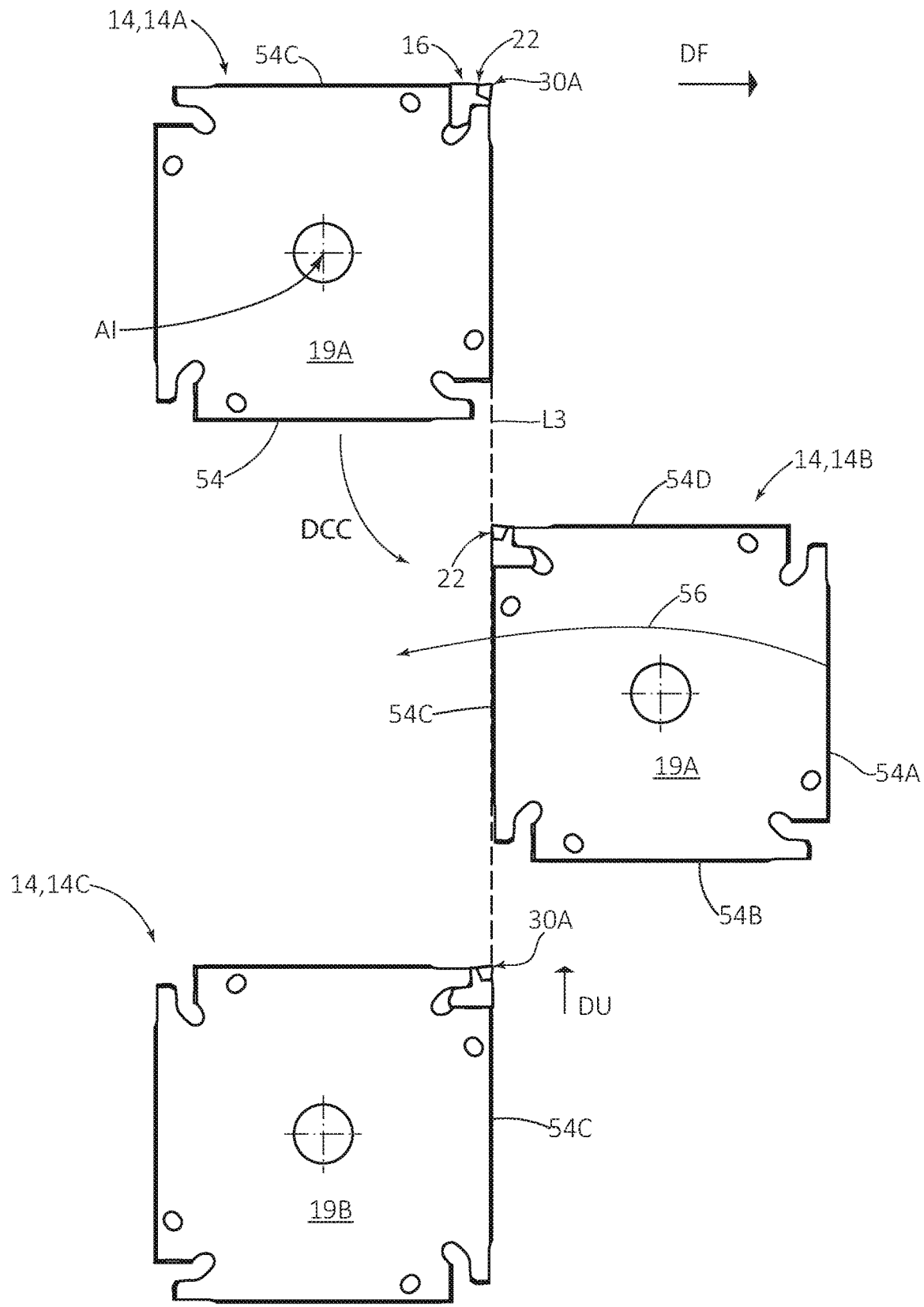
FIG. 3 is a schematic representation of the adaptor in FIG. 1A being brought from the X-axis feed orientation in FIG. 1A to the Y-axis feed orientation in FIG. 2.

Briefly referring to FIG. 3, the parting adaptor 14 further comprises first and second main adaptor sides 19A, 19B. First, second, third and fourth peripheral adaptor bearing surfaces 54A, 54B, 54C, 54D connect the first and second main adaptor sides 19A, 19B.

The holder 12 comprises a holder head portion 32 and a holder shank portion 34.

The holder shank portion 34 is secured to a machine interface 18 which can be a tool post or turret, etc.

The holder head portion 32 comprises an adaptor pocket 36.

The holder head portion 32 comprises a holder concave front surface 44, which is useful for structural strength when the holder 12 is used with a standard parting adaptor.

The adaptor pocket 36 comprises an adaptor pocket side surface 46, and a pocket projecting edge 48 extending therealong.

The pocket projecting edge 48 can comprise a pocket lower abutment surface 48A which, in this preferred but non-limiting example, faces the forward direction DF, a pocket rear abutment surface 48B which faces the upward direction DU, and preferably also a pocket relief recess 48C connecting the pocket lower and pocket rear abutment surfaces 48A, 48B.

The holder shank portion 34 further has a holder shank axis As, which is shown for understanding of the position thereof had the holder shank cross-sectional shape have been round.

A forwardmost imaginary line L1 extends in the X-axis direction (which in the reference directions shown is the forward direction DF) from an upwardmost holder shank surface 52A to the forwardmost cutting edge 30A.

In the present example, the name "upwardmost holder shank surface" is the forwardmost surface of the shank in the Y-axis direction (which in the reference directions shown is the upward direction DU), and the names are arbitrarily referenced herein relative to the X-axis direction, i.e. it is the holder shank surface most in the upward direction DU in FIG. 1A; it will be understood that the name "upwardmost" is merely a name and that for a square or rectangular shanks the surface indicated as 52A is the relevant reference surface as known in the art). For cylindrical or other round type shanks, the forwardmost surface is a thin line-like portion of the shank which is parallel to the holder shank axis AS and is the forwardmost portion of the shank in the Y-axis direction.

Since the position of the holder shank portion 34 is set from its connection with the machine interface 18, the position of the forwardmost cutting edge 30A is calibrated as zero in the CNC machine and does not require any offset to be input.

Even without the forwardmost imaginary line L1, which is a useful explanatory aid as shown in the side view of FIG. 1A, it is understood that the forwardmost cutting edge 30A is directly in the forward direction DF from the upwardmost holder shank surface 52A.

As further elaborated below, the adaptor pocket 36 is formed with a pocket projection 53 in the form of a pin 53A secured to a pin hole 53B (better shown in FIG. 4C).

Referring now to FIG. 2, to arrive at the shown position from FIG. 1A, the parting adaptor 14 was removed from the holder 12 and, for example, a two-step sequence comprising one rotation and one flip may be executed. For example, after removal, the parting adaptor 14 may first be rotated clockwise (90°) about the parting blade's index axis AI and then flipped from right-to-left, before being reinserted. In another sequence, the transition from FIG. 1A to FIG. 2 can be achieved by first flipping the parting adaptor 14 from left-to-right, and then rotating it 90° counter-clockwise, before being reinserted. A further sequence is described below, with respect to FIG. 3. Any of these sequences results in the parting adaptor 14 to now be oriented in a second orthogonal direction for machining the workpiece 20. With any of these sequences, the parting adaptor 14 has effectively been pivoted about the forwardmost cutting edge 30A to now be oriented in said second orthogonal direction for machining the workpiece 20.

Additionally, after removing the parting adaptor 14 but before remounting it to the holder 12, the pin 53A, shown in FIG. 1A, was first removed from the pin hole 53B and subsequently the parting adaptor 14 was mounted to the adaptor pocket 36.

More specifically, in the reconfigured tool, the upward direction DU is now also the Y-axis feed direction in which direction the tool assembly 10 is moved relative to the workpiece 20 in order to machine the workpiece 20 (which now is rotated in the clockwise direction DC).

Since the forwardmost cutting edge 30A in both positions (i.e. both in FIGS. 1A and 2) is aligned with the so-called upwardmost holder shank surface 52A, the only calibration needed for the orientation in FIG. 2 is in the forward and rearward directions DF, DR to ensure the forwardmost cutting edge 30A is aligned with a central workpiece axis AW as schematically shown by a second imaginary line L2 extending perpendicular to the forward and rearward directions DF, DR from the center point WC to the forwardmost cutting edge 30A.

A diagonal plane P (FIG. 2) can extend through the forwardmost cutting edge 30A and through opposing jaws of an insert pocket.

While the terms "index" and "reverse" are known in the art, there is no term known to the applicant for changing the orientation of a particular tool or cutting insert from the X-axis orientation to the Y-axis orientation (i.e. to change between said "two different orthogonal orientations").

One way is to define that the insert pocket rake and relief sides are pivoted (with the present shaped adaptor being pivoted at an angle of 180°) relative to each other.

Alternatively defined, the operative cutting insert 16 and the parting adaptor 14 it is mounted to can be flipped (i.e. rotated 180°) about the diagonal plane P (FIG. 2). At least the insert pocket is mirror symmetric in a first orientation to a second orientation achieved after the parting adaptor 14 is flipped about the diagonal plane P.

Yet, alternatively defined, the insert pocket can be pivoted 180° about a bisector line LB extending through the center of two orthogonal positions. The bisector line LB can be defined as extending through a predetermined cutting edge position defined by the insert pocket, as known in the art (the position occupied by the cutting edge 30A. More precisely the bisector line LB extends through the center of the parting adaptor 14 (not meaning necessarily through an index axis center AI, depending on the shape of the parting adaptor 14, but rather this means equally spaced from the first and second main adaptor sides 19A, 19B.

Still alternatively defined, relative to an operative cutting insert 16, the forwardmost cutting edge 30A can be held in a single position and the insert (as well as any component it is mounted to such as the adaptor) is pivoted about the front cutting edge by 180°. In other words, the opposite ends of the cutting edge 30A (which is seen in FIGS. 1A and 2 to extend into the sheet) are reversed.

To ensure understanding, now referring to FIG. 3, it is shown schematically how such change of position is accomplished (rather than simply showing a pivoted adaptor which is what is shown in FIG. 1A to FIG. 2, which is difficult to understand with a symmetric object using 2D drawings, a more elaborate explanation which can be shown is now exemplified for understanding, not that such exact sequence of movements are needed in practice).

The same adaptor 14 as described above is shown in first (initial), second (intermediate) and third (final) positions 14A, 14B, 14C, relative to the forward direction DF.

In the uppermost drawing, the adaptor's first position 14A can for example correspond to the orientation shown in FIG. 1A. (this example using the directions shown in FIG. 1A for the sake of explanation only; it could alternatively be the orientation in FIG. 2, in which case the forward direction DF shown in the first position 14 would be replaced with the upward direction DU and so forth, mutatis mutandis.).

From its initial position, the adaptor 14 (or an insert) in the initial position 14A is rotated 90° in the counterclockwise direction DCC, while keeping the forwardmost cutting edge 30A in the same position (i.e. not undergoing translational motion, but only rotational motion (for ease of understanding the adaptor 14 in the translated position 14B is drawn in a different, translated, position, but could be imagined to be adjacent the first position 14A with the forwardmost cutting edge 30A in the same, untranslated, location); such that the rake surface 22 of the adaptor 14 in the intermediate position 14B is now orthogonal to the first position 14A).

While keeping the rake surface 22 (and the forwardmost cutting edge 30A) in the same position (i.e. not undergoing translational motion) the adaptor 14B is flipped from right-to-left as indicated by the arrow 56.

Consequently, the adaptor 14 in final position 14C is in the second orthogonal orientation, which in this case is the Y-axis feed orientation, or the upward direction DU (using the non-limiting relative directions in this example).

Figure 4C:
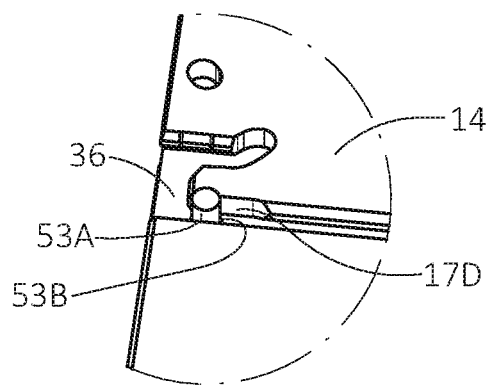
FIG. 4C is an enlarged and slightly rotated view of the encircled portion designated "IV" in FIG. 4A.
Figure 4A:
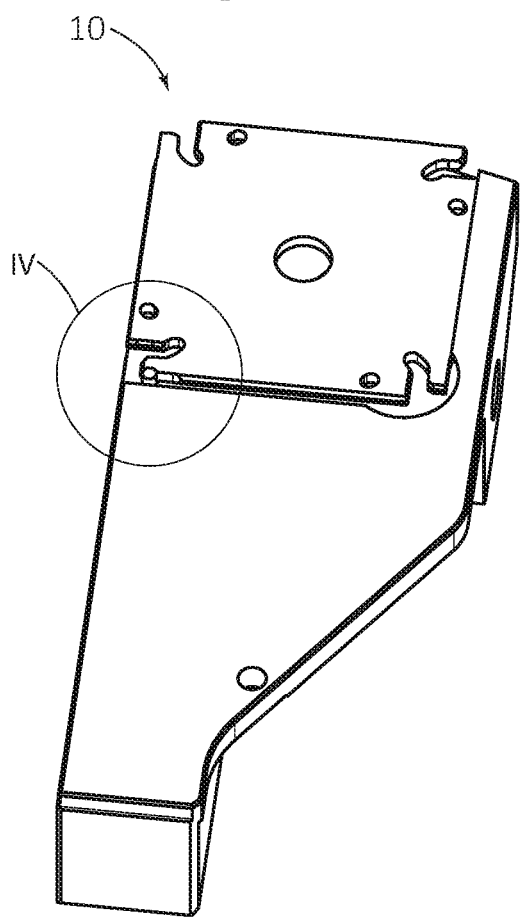
FIG. 4A is a perspective view of the holder and adaptor in the Y-axis feed orientation shown in FIG. 2 but prevented from being mounted by a pocket projection.
Figure 4B:
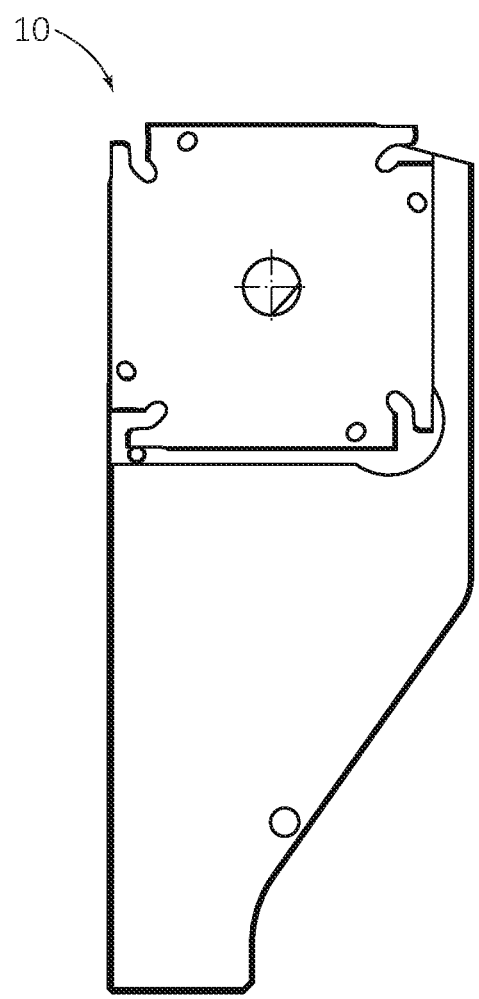
FIG. 4B is a side view of the holder and adaptor, corresponding to FIG. 4A.

Referring now to FIGS. 4A to 4C, if the pin 53A would not have been removed from the pin hole 53B, the adaptor 14 would not have been able to be mounted to the adaptor pocket 36 in the orientation shown in FIG. 2. In the shown example, when attempting to mount the adaptor 14 to the holder 12 in the same orientation as FIG. 2, the external pocket relief surface 17D abuts the pin 53A. Thus the pocket projection prevents incorrect mounting of the adaptor 14, when one of the specific orientations is going to be repeatedly used for machining.

The position of the pocket projection, while non-limiting, is particularly useful in an insert pocket location (i.e. where the insert pocket will be located on the adaptor pocket 36) when an insert pocket is asymmetric. This is because when the adaptor 14 is being mounted correctly, the user does not have to carry out any extra actions for mounting, and does not even need to notice or attend to the pocket projection.

Figure 5:
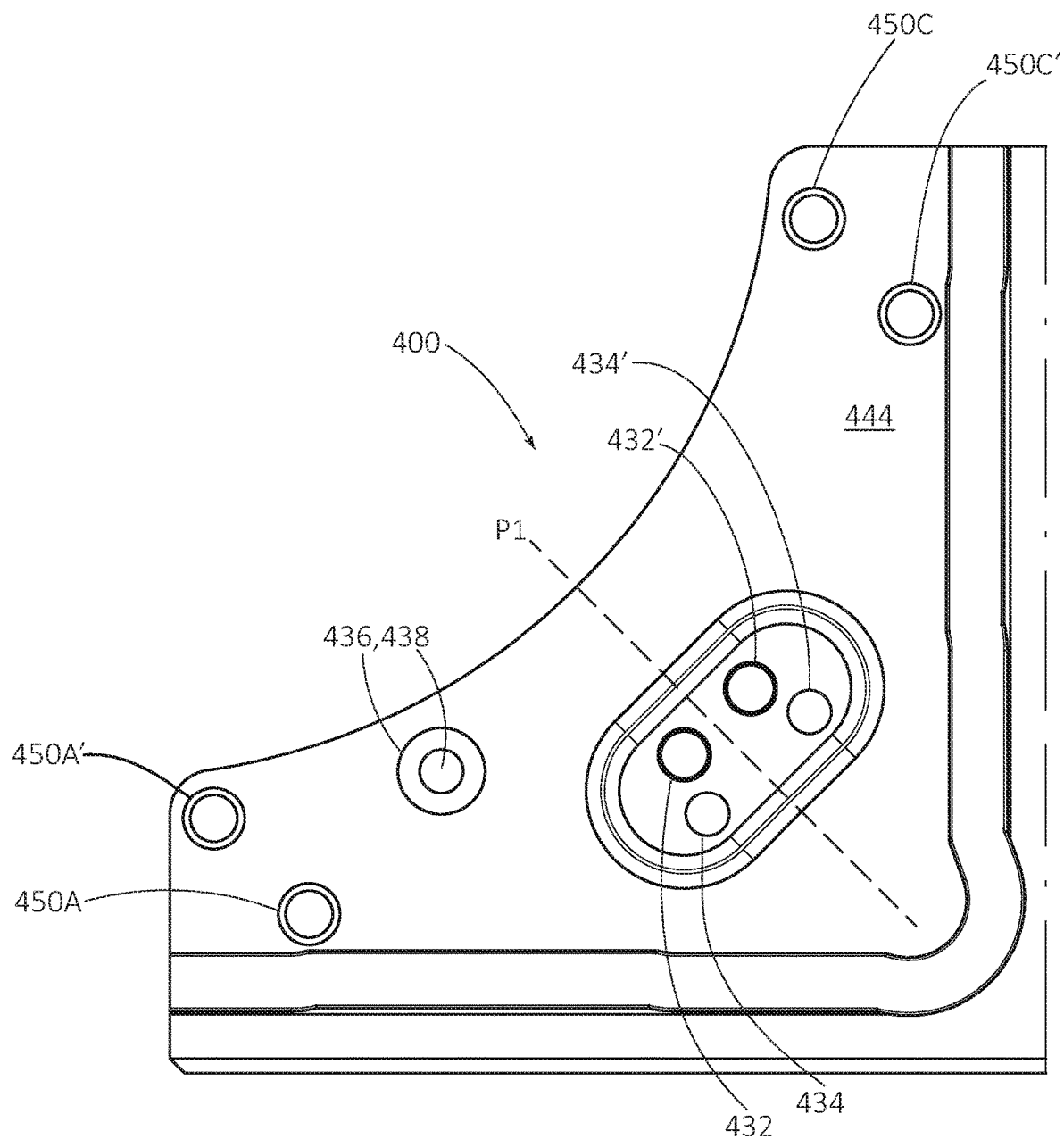
FIG. 5 is one possible pocket of another holder according to the present invention.

While the above-examples did not relate to a specific way in which a parting adaptor 14 is mounted (i.e. secured) to a holder 12, FIG. 5 will detail one exemplary way.

Referring to FIG. 5 of the present application, it will be noted that FIG. 19A of USPA 2019/0240741 has a tool holder 404 and an adaptor pocket similar, but by no means identical, to the adaptor pocket 400 of FIG. 5.

Corresponding features in FIG. 19A of USPA 2019/0240741 and present FIG. 5 are denoted with the same reference characters. Specifically, both adaptor pockets comprise: a first threaded tool hole 432 and a tool holder outlet aperture 434 for transferring coolant to a parting adaptor 14; a biasing hole 436 for providing for a biasing element 438 (FIG. 20A of USPA 2019/0240741); a pocket surface 444 provided with a plurality of peripheral threaded tool holes 450A, 450C (noting that in the present preferred embodiment only two peripheral threaded tool holes were found necessary instead of three as shown in USPA 2019/0240741).

Referring now only to FIG. 5 of the present application, in order to configure the adaptor pocket 400 for two different orthogonal orientations, additional elements were added with corresponding elements being suffixed with an apostrophe (').

Therefore, an additional first threaded tool hole 432', an additional tool holder outlet aperture 434', and two additional peripheral threaded tool holes 450A', 450C' were added. As seen in the plan view of FIG. 5, the adaptor pocket 400 has a pocket bisector plane P1, about which the first threaded tool holes 432, 432', the outlet apertures, 434, 434', and the peripheral threaded tool holes 450A, 450A. 450C, 450C' have mirror symmetry.

In the present example a biasing hole 436 and biasing element 438 are only provided for a single orientation. However, it will be understood that an additional biasing hole (not shown) could be provided and the biasing element 438 could be mounted to the additional biasing hole, if desired. In such case, the entire pocket surface 444 would have mirror symmetry about the pocket bisector plane P1.

It will be understood that FIG. 5 only shows one possible, out of many, modifications that can enable said two different orthogonal orientations.

It will be understood that an adaptor should have abutment surfaces (or external surfaces) to allow for more than one orthogonal orientation. These abutment surfaces can then be mounted to the same pocket surfaces in order to maintain a similar cutting edge position.

Figure 6A:
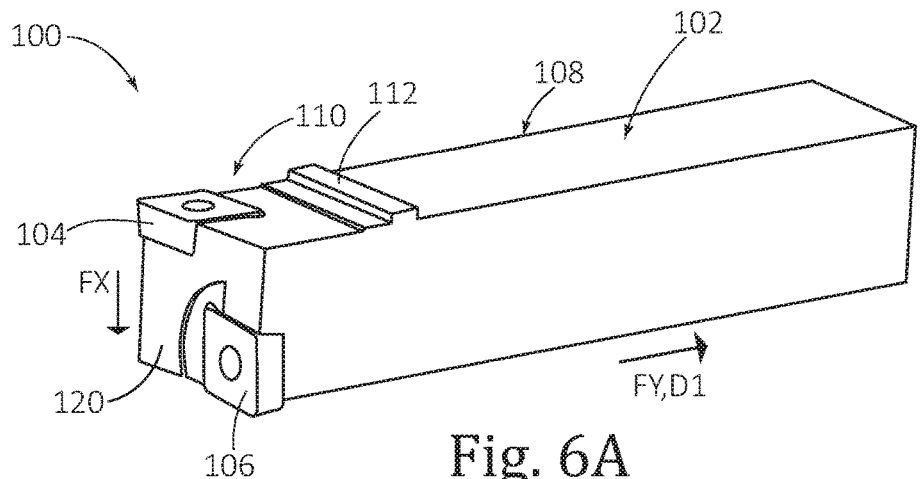
FIG. 6A is a side perspective view of yet another tool assembly according to the present invention.
Figure 6B:
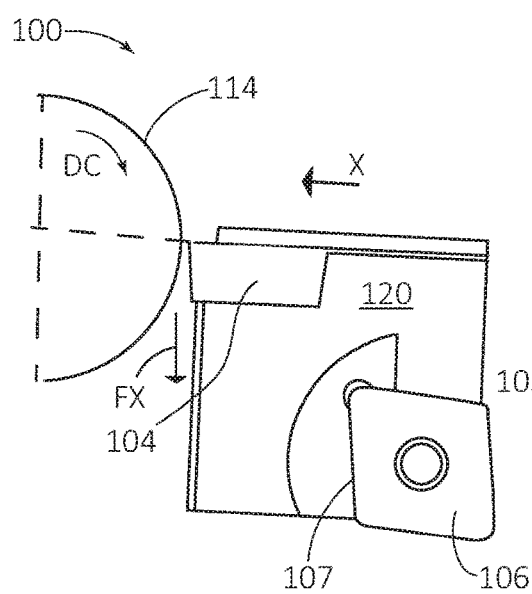
FIG. 6B is an end view of the tool assembly in FIG. 6A, showing the tool assembly in an X-axis feed orientation and a schematic workpiece.
Figure 6C:
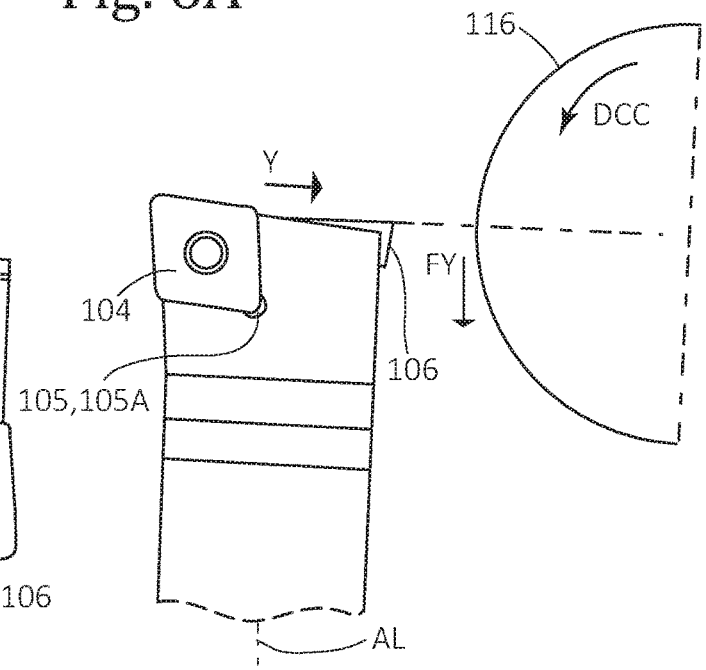
FIG. 6C is a side view of the tool assembly in FIG. 6A, showing the tool assembly in a Y-axis feed orientation and a schematic workpiece.

Finally, referring to FIGS. 6A to 6C, an example is shown of a tool assembly 100 configured for two different orthogonal orientations.

The tool assembly 100 comprises a holder 102 and at least one (and in the example shown, two), cutting inserts 104, 106 which are identical but are called herein an X-axis cutting insert 104 and a Y-axis cutting insert 106, for purposes of explanation.

Figure 6D:
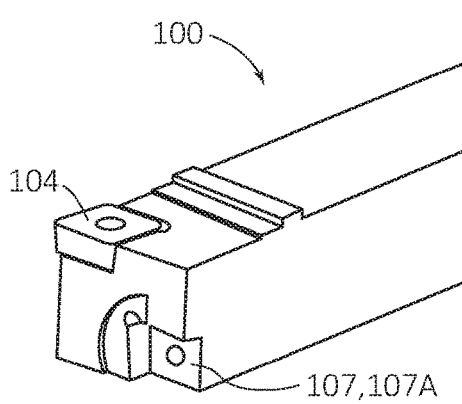
FIG. 6D is a side perspective view of the tool assembly in FIG. 6A with the Y-axis insert removed.

The X-axis cutting insert 104 is secured to an X-axis insert pocket 105 (FIG. 6C) and the Y-axis cutting insert 106 is secured to a Y-axis insert pocket 107 (FIG. 6D).

Preferably the holder comprises a shank portion 108 and a head portion 110. The X-axis pocket 105 and the Y-axis pocket 107 are both formed on the head portion 110 and both open out to an end surface 120 of the head portion 110. However, a X-axis pocket seating surface 105A and a Y-axis pocket seating surface 107A face in different, orthogonal directions.

An external rib 112, preferably extending perpendicular to a longitudinal axis AL of the shank portion 108, provides a stopper function between the head portion 110 and the shank portion 108.

In FIG. 6B, the X-axis cutting insert 104 is oriented to machine the workpiece 114 in a designated "X" direction. In this cutting configuration, a resulting first cutting force FX (i.e. the majority of the cutting force portion tangential to the workpiece 114, noting that the overall cutting force is a little more directed towards the shank portion 108) experienced by the operative X-axis cutting insert 104 is directed transverse to an interface direction D1 (direction D1 being basically from the head portion 110 towards the machine interface in which the shank portion 108 is retained). As seen in FIG. 6A, the interface direction D1 substantially extends along the length of the shank portion 108.

In FIG. 6C, the Y-axis cutting insert 106 is oriented to machine the workpiece 116 in a designated "Y" direction. In this cutting configuration, a resulting second cutting force FY (i.e. the majority of the cutting force portion tangential to the workpiece 114) experienced by the operative Y-axis cutting insert 106 is directed parallel to a direction D1 from the head portion towards the machine interface in which the shank portion 108 is retained. And again, as seen in FIG. 6C, the direction D1 substantially extends along the length of the shank portion 108. In some embodiments, D1 can extend in the rearward direction DR.

Since the X-axis and Y-axis insert pockets 105, 107 have been positioned distant to each other, in this preferred example at diametrically opposed corners of the head portion 110, they can be mounted simultaneously to the holder 102 and the workpieces 114, 116 can be machined, even though only one of the two inserts would be operational, at any given time.

Figure 6E:
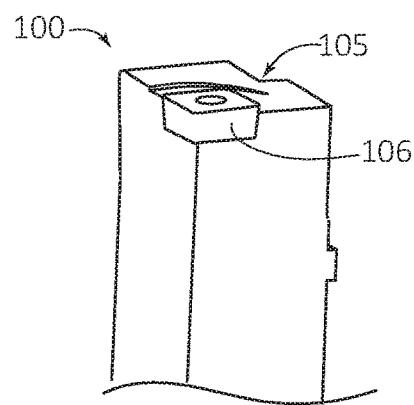
FIG. 6E is a side perspective view of the tool assembly in FIG. 6A with the X-axis insert removed.

If there is no need for machining in both orientations in a single mounting, the holder 102 can optionally have only a single cutting insert mounted thereto as shown in FIGS. 6D and 6E.

The invention claimed is:

1. A parting tool configured to selectively perform X-axis cutting in a forward direction (DF) and Y-axis cutting in an upward direction (DU) which is perpendicular to the forward direction (DF), the parting tool comprising:
 a tool holder (12) comprising:
  a holder head portion (32);
  a holder shank portion (34) configured to be secured to a machine interface (18); and
  an adaptor pocket (36, 400) formed in the holder head portion (32) and comprising:
   a first threaded tool hole (432);
   a first additional threaded tool hole (432');
   a tool holder outlet aperture (434) for transferring coolant to the parting adaptor (14);
   an additional tool holder outlet aperture (434'); and
   a pocket bisector plane (P1) about which the first threaded tool holes (432, 432'), and the outlet apertures, (434, 434') have mirror symmetry.
 a parting adaptor (14) comprising:
  opposing first and second sides (19A, 19B);
  a peripheral edge connecting the first and second sides; and
  a plurality of insert pockets (15A, 15B, 15C, 15D); and an operative cutting insert (16) retained in one of said plurality of insert pockets, the operative cutting insert having a forwardmost cutting edge (30A);

wherein:

the parting adaptor (14) is configured to be selectively mounted to the adaptor pocket (36) of the tool holder (12):

(a) in a first orthogonal position in which the first side (19A) of the parting adaptor faces the adaptor pocket (36) and the forwardmost cutting edge (30A) is oriented such that the parting tool is configured for X-axis cutting; and also (b) in a second orthogonal position in which the second side (19B) of the parting adaptor faces the adaptor pocket (36) and the forwardmost cutting edge (30A) is oriented such that the parting tool is configured for Y-axis cutting.

2. The parting tool according to claim 1, wherein the adaptor pocket (400) comprises:

a plurality of peripheral threaded tool holes (450A, 450C); and a plurality of additional peripheral threaded tool holes (450A', 450C'); wherein:

the plurality of peripheral threaded tool holes (450A, 450C) are mirror symmetric about the pocket bisector plane (P1) with respect to the plurality of additional peripheral threaded tool holes (450A', 450C').

3. The parting tool according to claim 1, wherein:

the holder shank portion (34) comprises an upwardmost holder shank surface (52A) and a holder shank cross-sectional shape;

the holder shank cross-sectional shape is square or rectangular; and the forwardmost cutting edge (30A) is aligned with the upwardmost holder shank surface (52A) in both the first orthogonal position and the second orthogonal position.

4. The parting tool according to claim 1, wherein:

the holder shank portion (34) comprises an upwardmost holder shank surface (52A) and a holder shank cross-sectional shape;

the holder shank cross-sectional shape is round; and the holder shank axis (AS) extends to the forwardmost cutting edge (30A) in both the first orthogonal position and the second orthogonal position.

5. The parting tool according to claim 1, wherein:

the holder head portion (32) comprises a holder concave front surface (44).

6. The parting tool according to claim 1, wherein:

the adaptor pocket (36) comprises an adaptor pocket side surface (46) and a pocket projecting edge (48) extending therealong, the pocket projecting edge (48) comprising a pocket lower abutment surface (48A) and a pocket rear abutment surface (48B);

the pocket lower abutment surface (48A) faces the forward direction (DF); and the pocket rear abutment surface (48) faces the upward direction (DU).

7. The parting tool according to claim 1, wherein:

the adaptor pocket (36) comprises a pocket projection (53) configured to prevent mounting of the parting adapter in the adaptor pocket in one first and second orthogonal orientations.

8. The parting tool according to claim 7, wherein:

the pocket projection (53) comprises a removable pin (53B) secured to a pin hole (53B) formed in the adaptor pocket (36).

9. The parting tool according to claim 1, wherein the adaptor pocket (400) further comprises a biasing hole (436) for providing for a biasing element (438).

10. A parting tool configured to selectively perform X-axis cutting in a forward direction (DF) and Y-axis cutting in an upward direction (DU) which is perpendicular to the forward direction (DF), the parting tool comprising:

a tool holder (12) comprising:

a holder head portion (32);

a holder shank portion (34) configured to be secured to a machine interface (18); and an adaptor pocket (36, 400) formed in the holder head portion (32) and comprising:

a planar pocket surface (444);

a first plurality of threaded holes (450A, 450C) formed on the pocket surface (444) and configured to secure a parting adaptor in a first orientation for X-axis cutting; and a second plurality of threaded holes (450A', 450C') formed on the pocket surface (444) and configured to secure said parting adaptor in a second orientation for Y-axis cutting; wherein:

the first plurality of holes and the second plurality of holes are mirror symmetrically positioned about a bisector plane (P1).

11. The parting tool according to claim 10, wherein the holder head portion (32) comprises a holder concave front surface (44).

12. The parting tool according to claim 10, wherein:

the adaptor pocket (36) comprises an adaptor pocket side surface (46) and a pocket projecting edge (48) extending therealong, the pocket projecting edge (48) comprising a pocket lower abutment surface (48A) and a pocket rear abutment surface (48B);

the pocket lower abutment surface (48A) faces a forward direction (DF); and the pocket rear abutment surface (48) faces an upward direction (DU).

13. The parting tool according to claim 10, wherein the adaptor pocket (400) further comprises a biasing hole (436) for providing for a biasing element (438).

14. The parting tool according to claim 10, wherein the adaptor pocket (400) comprises:

a tool holder outlet aperture (434) for transferring coolant to the parting adaptor (14);

an additional tool holder outlet aperture (434); and the outlet apertures, (434, 434') have mirror symmetry about the pocket bisector plane (P1).

15. A tool holder (12) comprising:

a holder head portion (32);

a holder shank portion (34) configured to be secured to a machine interface (18); and an adaptor pocket (36, 400) formed in the holder head portion (32) and comprising:

a planar pocket surface (444);

a first plurality of threaded holes (450A, 450C) formed on the pocket surface (444) and configured to secure a parting adaptor in a first orientation for X-axis cutting; and a second plurality of threaded holes (450A', 450C') formed on the pocket surface (444) and configured to secure said parting adaptor in a second orientation for Y-axis cutting; wherein:

the first plurality of holes and the second plurality of holes are mirror symmetrically positioned about a bisector plane (P1).

16. The tool holder according to claim 15, wherein the holder head portion (32) comprises a holder concave front surface (44).

17. The tool holder according to claim 15, wherein:
- the adaptor pocket (36) comprises an adaptor pocket side surface (46) and a pocket projecting edge (48) extending therealong, the pocket projecting edge (48) comprising a pocket lower abutment surface (48A) and a pocket rear abutment surface (48B);
- the pocket lower abutment surface (48A) faces a forward direction (DF); and
- the pocket rear abutment surface (48) faces an upward direction (DU).

18. The tool holder according to claim 15, wherein the adaptor pocket (400) further comprises a biasing hole (436) for providing for a biasing element (438).

19. The tool holder according to claim 15, wherein the adaptor pocket (400) comprises:
- a tool holder outlet aperture (434) for transferring coolant to the parting adaptor (14);
- an additional tool holder outlet aperture (434); and
- the outlet apertures, (434, 434') have mirror symmetry about the pocket bisector plane (P1).

* * * * *